United States Patent [19]

Takeda et al.

[11] Patent Number: 4,670,730

[45] Date of Patent: Jun. 2, 1987

[54] PRESSURE SENSOR AND A METHOD OF ARRANGING A PRESSURE SENSOR

[75] Inventors: Seijiro Takeda, Ibaraki; Norio Ichikawa, Mito; Kazuhiro Tsuruoka, Katsuta, all of Japan

[73] Assignee: Hitachi, Ltd., Tokyo, Japan

[21] Appl. No.: 751,846

[22] Filed: Jul. 5, 1985

[30] Foreign Application Priority Data

Jul. 5, 1984 [JP] Japan ............... 59-139304

[51] Int. Cl.$^4$ ............................................. G01L 1/22
[52] U.S. Cl. ........................................ 338/4; 338/36; 338/42; 29/610 SG; 73/726
[58] Field of Search ...................... 338/2–5, 338/42, 36; 29/592 R, 610 SG, 581; 73/715, 720, 721, 700, 726

[56] References Cited

U.S. PATENT DOCUMENTS 3,697,917 10/1972 Orth et al. ............................. 338/2
3,697,919 10/1972 Orth et al. ............................ 338/42

Primary Examiner—E. A. Goldberg
Assistant Examiner—M. M. Lateef
Attorney, Agent, or Firm—Antonelli, Terry & Wands

[57] ABSTRACT

A flange provided on a tubular metallic member coupled by glass bonding to the glass base to which the strain guage is fixed is made to contact with a receptacle step formed in a housing section of a housing, while pressurizing a metal ring in the housing section to cause plastic deformation of a part of the ring material into a coupling groove formed in the inner peripheral surface of the housing section, thereby coupling the metal ring and the housing.

16 Claims, 2 Drawing Figures

PRESSURE SENSOR AND A METHOD OF ARRANGING A PRESSURE SENSOR

FIELD OF THE INVENTION

The present invention relates to a pressure sensor and a method of arranging thereof for sensing the fluid pressure introduced to the reverse side of a strain gauge and, more particularly, to a pressure sensor suitable for use in control of the pressure of a fluid in the driving system or suspension system, as well as to the control of operation of construction machines.

BACKGROUND OF THE INVENTION

There has been a conventional pressure sensor of the type having such a structure that a housing is hermetically sealed to a glass support which is fixed to a semiconductor strain gauge by means of anodic bonding.

For instance, such a pressure sensor is disclosed in U.S. Pat. No. 3,697,919 issued on Oct. 10, 1972 and titled "Semiconductor Pressure Transducer Structure".

In this prior art, the glass support is hermetically sealed to the housing by a wedge-shaped seal in the manner that the glass support is fastened by tapered walls of a wedge-shaped seal which faces to inside tapered walls of the housing. The tapered walls of the wedge-shaped seal must be long along the axial direction thereof. Because, if the tapered walls of the wedge-shaped seal are short, stresses caused by measuring pressure are applied concentrically to the inside walls of the housing with small areas. The semiconductor strain gauge has to be disposed apart from the tapered walls of the wedge-shaped seal for avoiding the fastening stress of the walls. Then, the prior art is provided with a long structure of the glass support along the axial direction thereof.

SUMMARY OF THE INVENTION

An object of the present invention is to provide a pressure sensor and a method of arranging a pressure sensor which is small in size.

The present invention is characterized in that a glass base, or glass support having a semiconductor strain-gauge mounted thereon, is supported by a tubular metallic member in the end of the glass base by applying glass bonding, and a flange of the tubular metallic member is clamped to a housing using a metal ring by means of plastic deformation.

According to the present invention, as the tubular metallic member is fixed by the glass bonding in the end of the glass base, the concentration of applied forces to the housing caused by measuring pressure and to the semiconductor strain-gauge can be avoided without using a long glass base as shown in the prior art. Therefore, the present invention is able to accomplish the object thereof.

DETAILED DESCRIPTION OF THE PREFERRED EMBODIMENTS

Figure 1:
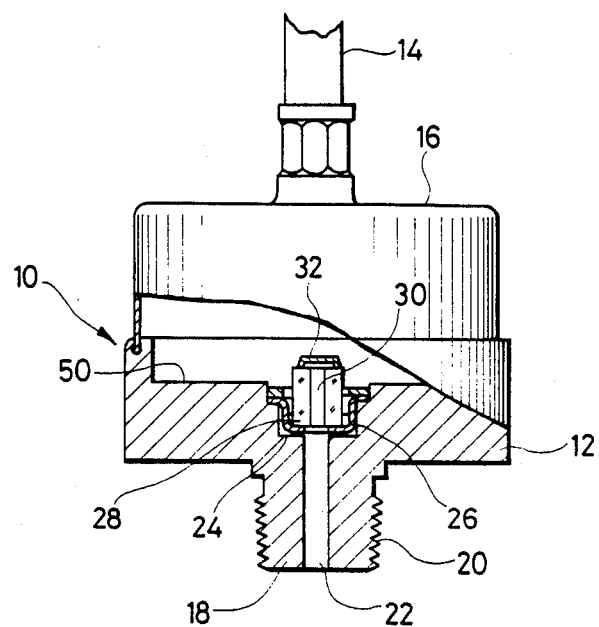
FIG. 1 is a partially-sectioned front elevational view of a pressure sensor in accordance the invention.

Referring to FIG. 1, the pressure sensor 10 has a metallic housing 12 having a substantially T-shaped cross-section and a cover 16 fixed to the housing 12 by, for example, caulking. The cover 16 is provided with lead wires 14. The metallic housing 12 has a protrusion 18 on the outer peripheral surface of which is formed a screw thread 20 by means of which the pressure sensor 10 is mounted on a pressure source. The metallic housing 12 is provided in the central portion thereof with a pressure introduction port 22 extending along the axis thereof. The end 50 of the pressure introduction port within the metallic housing 12 opens in a housing section 24 formed in the metallic housing 12.

A cushioning metal cylinder 26 having a bowl-like form is fixed to the housing section 24, while a glass base 28 is fixed in the cushioning metal cylinder 26. The glass base 28 is provided at its one end with a pressure measuring port 30 which is covered by a semiconductor strain gauge 32 fixed to the same end of the glass base 28.

Figure 2:
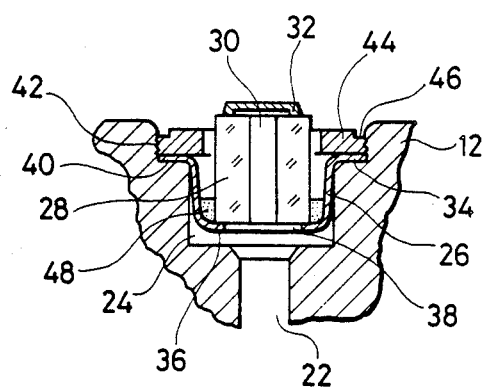
FIG. 2 is a sectional view showing the detail of the portion where a gauge is secured.

As will be seen from FIG. 2, the cushioning metal cylinder 26 has a flange 34 formed on the end thereof adjacent the inlet for the glass base 28. A bottom 36 for receiving the glass base 28 is provided at the other end of the cushioning cylinder 26. The bottom 36 is provided at its bottom with a bottom hole 38 which provides a communication between the pressure introduction port 22 and the pressure measuring port 30.

The flange 34 of the cushioning metal cylinder 26 abuts a receptacle step 40 provided on the inner peripheral surface of the housing section 24 of the metallic housing 12. As will be seen from FIG. 2, a plurality of coupling grooves 42 are formed in the inner peripheral surface of the housing section 24 above the receptacle step 40. The grooves have a pitch of 0.15 to 0.3 mm and a depth of 0.05 to 0.15 mm, respectively. A metal ring 44 is disposed on the flange 34 of the cushioning metal cylinder 26. The metal ring 44 is adapted to be pressed at its outer peripheral portion such as to press the flange 34 onto the receptacle step 40. As a result of the pressing, the metal ring 44 is partially recessed as at 46 and a part of the ring material plastically deforms and flows into coupling grooves 42 so that the metal ring 44 is strongly coupled to the metal housing 12 made of steel. The lower end of the glass base 28 is glass hermetically bonded to the cushioning metal cylinder 26 by means of a seal glass 48.

The pressure sensor 10 of this embodiment can be produced in accordance with the following process.

As the first step, the glass base 28 is inserted into the cushioning metal cylinder 26 and is hermetically bonded to the latter by melting the seal glass 48. Preferably, the cushioning metal cylinder 26 is made of a material having a thermal expansion coefficient which approximates that of the glass base 28. For instance, when the glass base 28 is made of pyrex glass, the cushioning metal cylinder is made of iron-nickel-cobalt alloy such as kovar.

Then, the semiconductor strain gauge 32 is placed on the glass base 28 coupled to the cushioning metal cylinder 26 and is bonded to the same by an anodic bonding technique. Thereafter, the cushioning metal cylinder 26 is inserted into the housing section 24 of the metal housing 12 placed in a predetermined die. With the ring 44 inserted into the housing section 24 and placed on the flange 34, the outer peripheral edge of the metallic ring is pressed by a ring-shaped pressing tool which is not shown, such as to cause a plastic flow or deformation of the material of the metal ring 44 by impression pressure of 80 to 95 kg/mm$^2$ through said flange portion. A packing may be placed on the upper or lower side of the flange 34.

Preferably, the metal ring 44 is made of a soft metal which is easy to plastically deform. Examples of such a soft metal are: Cu, Al, Ag-Cu alloy, Ag-Su-Cu alloys and so forth.

After the cushioning metal cylinder 26 is fixed to the metallic housing 12 by means of the metal ring 44, electric wiring is made and the cover 16 is secured to the metal housing 12.

After the assembly of the pressure sensor 10, the semiconductor strain gauge 32 is not distorted and any change in the resistance in the semiconductor strain gauge due to diffusion of heat is avoided. In addition, since the cushioning metal cylinder 26 is fixed to the metallic housing 12 by virtue of the plastic deformation of the material of the metal ring 44, there is no fear of damaging of the seal glass 48 and any softening and deformation of the seal glass due to heat is avoided advantageously. The cushioning metal cylinder 26 is fixed to the metallic housing 12 by the flange 34 and is made of a material having a thermal expansion coefficient approximating that of the glass base 28, so that it exhibits a sufficiently high resistance to thermal impact.

The oil which is sealed in the pressure introduction port 22 and the pressure measuring port 30 as the object of the measurement of pressure is introduced into the pressure measuring port 30 through a pressure introduction port 22 in the metal housing 12, so that the oil pressure acts on the reverse side of the semiconductor strain gauge 32, thus avoiding contamination of the surface of the semiconductor strain gauge. The bonding between the glass base 28 and the cushioning metal cylinder 26 is attained hermetically by means of the seal glass 48, while the metal ring 44 is coupled to the metal housing 12 by a tight coupling force produced as a result of the plastic deformation of the material of the metal ring 44 into the coupling groove formed in the metallic housing 12. At the same time, the flange 34 of the cushioning metal cylinder 26 is held in close contact with the receptacle step 40. For these reasons, the pressure sensor of the embodiment can have distinguished gas-tightness, pressure resistance and resistance to heat and vibration.

In order to confirm the reliability of the bonding and coupling between adjacent parts in the pressure sensor 10 thus produced, a durability test was conducted in which the sensor was subjected to a heating/cooling cycle between $-40$ and $+150°$ C. and a pressure cycle at 10 kg/cm$^2$. As a result, a sufficiently high reliability was confirmed.

What we claim is:

1. A pressure sensor comprising a housing which introduces measuring pressure through a pressure introducing port, a glass base which is enclosed in said housing and penetrated by a pressure measuring port, a strain gauge fixed to one end portion of said glass base by anodic bonding to cover one side of said pressure measuring port, a tubular metallic member connected to the other end of said glass base by glass bonding, said tubular metallic member having a flange provided on a portion thereof for being fixed to said housing, said housing having a receptacle step formed on an inner peripheral surface thereof for enabling mounting of said flange, and a metal ring being clamped to an inner peripheral surface of said step by plastic deformation so as to sandwich said flange between said metal ring and a planar surface of said step.

2. A pressure sensor as defined in claim 1, wherein said tubular metallic member comprises iron-nickel-cobalt alloy.

3. A pressure sensor as defined in claim 1, wherein said glass base comprises borosilicate glass.

4. A pressure sensor as defined in claim 1, wherein said housing comprises steel, and said ring comprises copper.

5. A pressure sensor as defined in claim 1, wherein said ring is clamped to the inner peripheral surface of said step without contacting said glass base at the inner peripheral portion thereof.

6. A pressure sensor as defined in claim 1, wherein said ring is clamped to said housing by impressing pressure of 80 to 95 kg/mm$^2$ at a peripheral portion of said ring.

7. A pressure sensor as defined in claim 1, wherein said ring is a disk member, said step is formed with a plurality of grooves along the outer periphery thereof, and said grooves have a pitch of 0.15 to 0.3 mm and a depth of 0.05 to 0.15 mm, respectively, said ring being coupled to said grooves by the plastic deformation.

8. A pressure sensor as defined in claim 1, wherein said ring is clamped to the inner peripheral surface of said step without contacting said glass base with an inner peripheral portion of said ring, whereby said strain gauge is not distorted and any change in resistance in said strain gauge due to diffusion of heat is avoided.

9. A pressure sensor as defined in claim 1, wherein said metal ring is a plastically deformable ring and is clamped to the inner peripheral surface of said step by plastic deformation of said ring.

10. A method of arranging a pressure sensor comprising the steps of fixing a strain gauge to one end portion of a glass base penetrated by a pressure measuring port by anodic bonding, fixing another end portion of the glass base to a housing which introduces measuring pressure through a pressure introducing port, connecting a tubular metallic member to the other end of the glass base by glass bonding prior to fixing the strain gauge to the one end portion of the glass base, and clamping a metal ring to a receptacle step formed on an inner peripheral surface of the housing by plastic deformation so as to sandwich a flange provided on the tubular metallic member between the ring and a planar surface of the step.

11. A method as defined in claim 10, wherein the ring is clamped to the inner peripheral surface of the step without contacting the glass base with an inner peripheral portion of the ring.

12. A method as defined in claim 11, wherein the ring is clamped to the housing by impressing a pressure of 80 to 95 kg/mm$^2$ at an outer peripheral portion of the ring.

13. A method as defined in claim 10, wherein the ring is clamped to the receptacle step by plastic deformation of the ring.

14. A pressure sensor comprising a housing which introduces measuring pressure through a pressure introducing port, a glass base which is enclosed in said housing and penetrated by a pressure measuring port, a strain gauge fixed to one end portion of said glass base by anodic bonding to cover one side of said pressure measuring port, a bowl-shaped cushioning metallic member connected to the other end of said glass base for supporting said glass base and suspending said glass base in said housing, said cushioning metallic member having an outwardly extending flange provided on a portion thereof for being fixed to said housing so as to enable suspending of said glass base within said housing.

15. A pressure sensor as defined in claim 14, wherein said housing has a receptacle step formed on an inner peripheral surface thereof for enabling mounting of said flange, and a metal ring is clamped to an inner peripheral surface of said step by plastic deformation so as to sandwich said flange between said metal ring and a planar surface of said step.

16. A pressure sensor as defined in claim 15, wherein said metal ring has an inner peripheral surface spaced from an outer peripheral surface of said glass base thereby delimiting an annular space therebetween whereby said strain gauge is not distorted and any change in resistance in said strain gauge due to diffusion of heat is avoided when said ring is clamped to the inner peripheral surface of said step.

* * * * *